United States Patent
Delavaux et al.

(10) Patent No.: US 6,819,481 B2
(45) Date of Patent: Nov. 16, 2004

(54) BIDIRECTIONAL WAVE DIVISION MULTIPLEX SYSTEMS

(75) Inventors: Jean-Marc Pierre Delavaux, Pittstown, NJ (US); Stojan Radic, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 410 days.

(21) Appl. No.: 09/873,696

(22) Filed: Jun. 4, 2001

(65) Prior Publication Data

US 2002/0181043 A1 Dec. 5, 2002

(51) Int. Cl.[7] .............................................. H04B 10/12
(52) U.S. Cl. ....................................................... 359/341.2
(58) Field of Search ......................... 359/341.2; 398/67

(56) References Cited

U.S. PATENT DOCUMENTS

| | | | | |
|---|---|---|---|---|
| 5,633,741 A | * | 5/1997 | Giles | 398/79 |
| 5,740,289 A | * | 4/1998 | Glance | 385/24 |
| 6,160,660 A | * | 12/2000 | Aina et al. | 359/341.2 |
| 6,529,656 B2 | * | 3/2003 | Lee et al. | 385/24 |
| 6,608,709 B2 | * | 8/2003 | Duerksen | 385/24 |
| 2001/0019449 A1 | * | 9/2001 | Krummrich | 359/341.2 |
| 2001/0038477 A1 | * | 11/2001 | Hwang | 359/124 |
| 2002/0018286 A1 | * | 2/2002 | Lee et al. | 359/337.2 |
| 2002/0039212 A1 | * | 4/2002 | Lee et al. | 359/127 |
| 2002/0039213 A1 | * | 4/2002 | Duerksen | 359/127 |

OTHER PUBLICATIONS

Fifth Optoelectronics and Communications Conf. (OECS 2000) Tech. Digest Jul. 2000.

* cited by examiner

Primary Examiner—Nelson Moskowitz
Assistant Examiner—Deandra M. Hughes
(74) Attorney, Agent, or Firm—B. H. Freedman

(57) ABSTRACT

A bidirectional WDM optical system in which crosstalk between interleaved channels of different wavelengths is suppressed by the inclusion in the amplifier gain block of four-port filters that discriminate on the basis of the wavelength of the interleaved signals passing through the four port filters.

13 Claims, 6 Drawing Sheets

110

120

BIDIRECTIONAL WAVE DIVISION MULTIPLEX SYSTEMS

FIELD OF THE INVENTION

This invention relates to a terrestrial wavelength-division multiplexing (WDM) system in which the transmission is bidirectional along a single optical waveguide, such as a fiber.

BACKGROUND OF THE INVENTION

The demand for increasing channels in optical WDM systems has created interest in bidirectional systems in which a single wave guide, such as a fiber, is used to transmit optical signals in the two opposite directions along the fiber essentially to double the number of channels that can be transmitted along the fiber. There have been two principal issues that need to be addressed in the design of such systems. First there needs to be a wavelength channel allocation plan that provides adequate isolation between channels with a minimum of overlap. To this end there needs to be provided adequate spacing in the wavelengths of adjacent channels to maintain the necessary isolation between the channels. An important consideration has been the need to avoid especially four-photon mixing (FPM) between adjacent channels traveling in the same direction, a factor which imposes a limit on the spectral density of the system, where spectral density is defined as the number of channels that can be transmitted within a unit spectral interval under essentially error-free conditions. As is known, each set of two codirectional WDM channels generates multiple new optical signals overlapping in frequency with adjacent channels, thus generating in-band crosstalk that reduces error-free transmission. The efficiency of the FPM process for generating intervening channels is directly dependent on the wavelength spacing among the WDM channels. Low FPM penalty requires wide channel spacing among WDM channels for signals traveling in the same direction. However, counterdirectionally propagating channels do not contribute significantly to the FPM process so that the spacing in an equidistant WDM grid can be halved without an observable increase in the FPM penalty if one interleaves a set of counterpropagating WPM channels. This channel structure is known in the art as an interleaved bidirectional WDM architecture and allows for spectral densities essentially double those feasible for a comparable unidirectional channel structure.

However an interleaved bidirectional WDM architecture still requires separate transmitters, receivers and compound amplifiers to provide gain in each of the two opposite directions.

A problem that arises in such an architecture is that a signal propagating in a given direction will inevitably experience factors that result in some reflection of the signal that will cause part of it to travel in a direction opposite, or counter, to its original direction of propagation and so to affect deleteriously the signals of channels launched to propagate in such opposite direction. Such energy will be described as counterpropagating or counterdirectional energy.

Accordingly, design of a bidirectional interleaved WDM system requires special consideration, particularly in the construction of the optical amplifiers of the system, since they are generally used to provide both channel amplification and channel isolation among counterpropagating sets of channels.

The present invention presents a novel approach to the isolation need of counterpropagating reflected energy in such bidirectional WDM systems.

SUMMARY OF THE INVENTION

The invention provides novel forms of optical amplifier architecture to neutralize counterpropagating signals. More particularly, the invention involves inserting along the light wave paths suppression filters of appropriate spectral form, to be termed interleavers, to selectively pass in a given direction only one of the two sets of interleaved channels. In a preferred form, the interleaver is a four-port filter that passes channel signals of a first of two sets of spectrally interleaved signals that propagates in a given direction from an input port to an output port and continues the light appropriately along a path in the desired direction, but shunts counterdirectional propagating light entering the same input port to a different output port for attenuation or absorption. A device, typical of the kind that can serve as the interleaver, is the chromatic dispersion-free Fourier transform-based wavelength splitter described in a paper entitled "Chromatic dispersion free Fourier transform-based wavelength splitters for D-WDM" that was published in the *Fifth Optoelectronics and Communications Conference IDECC 2001 Technical Digest*, July 2000, pp. 374–375. Various arrangements will be described of particular design to suppress selectively counterpropagating light arising from reflections along the prescribed wave path.

In particular, a feature of the invention is a gain block for use in a WDM transmission system in which a first of two sets of optical channels of interleaved wavelengths propagates along a waveguide in one direction with low loss selectively and the second set of optical channels propagates along the same guide with low loss selectively in the direction opposite to the first direction. A characteristic of gain blocks in accordance with the invention is the inclusion of interleaver elements that are basically four-port elements is that the port at which a signal exits is a function both of the port at which it enters and the wavelength of the signal. By such inclusion there is substantially reduced the effect of reflections in the system that give rise to spurious signals that will be described as counterdirectional propagating signals, and that are of the wavelengths to be controlled by the interleaver.

The invention will be better understood from the following more detailed description taken in conjunction with the accompanying drawing.

Each of FIGS. 5–12 is a different example of a gain block suitable for use in a bidirectional optical WDM transmission system in accordance with the invention.

DETAILED DESCRIPTION

Figure 1:
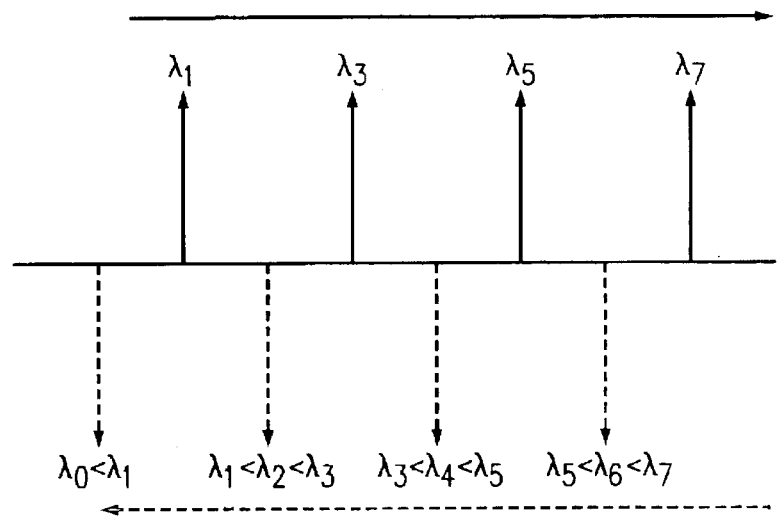
FIG. 1 is a wavelength grid of two interleaved sets of equally spaced channels for propagating in opposite directions along a common waveguide, such as an optical fiber.

FIG. 1 is a typical wavelength grid of interleaved channels in a bidirectional transmission system. The set of odd-numbered channels $\lambda_1$, $\lambda_3$, $\lambda_5$, and $\lambda_7$ are transmitted selectively from left to right. The set of even-numbered channels $\lambda_2$, $\lambda_4$, $\lambda_6$, and $\lambda_8$ are transmitted selectively from right to left. Channel energy of either set traveling in the direction opposite its assigned direction will be described as either counterdirectional or counterpropagating. The channels are desirably spaced apart essentially equally, the assigned wavelength increasing monotonically the higher the channel number.

Figure 2:
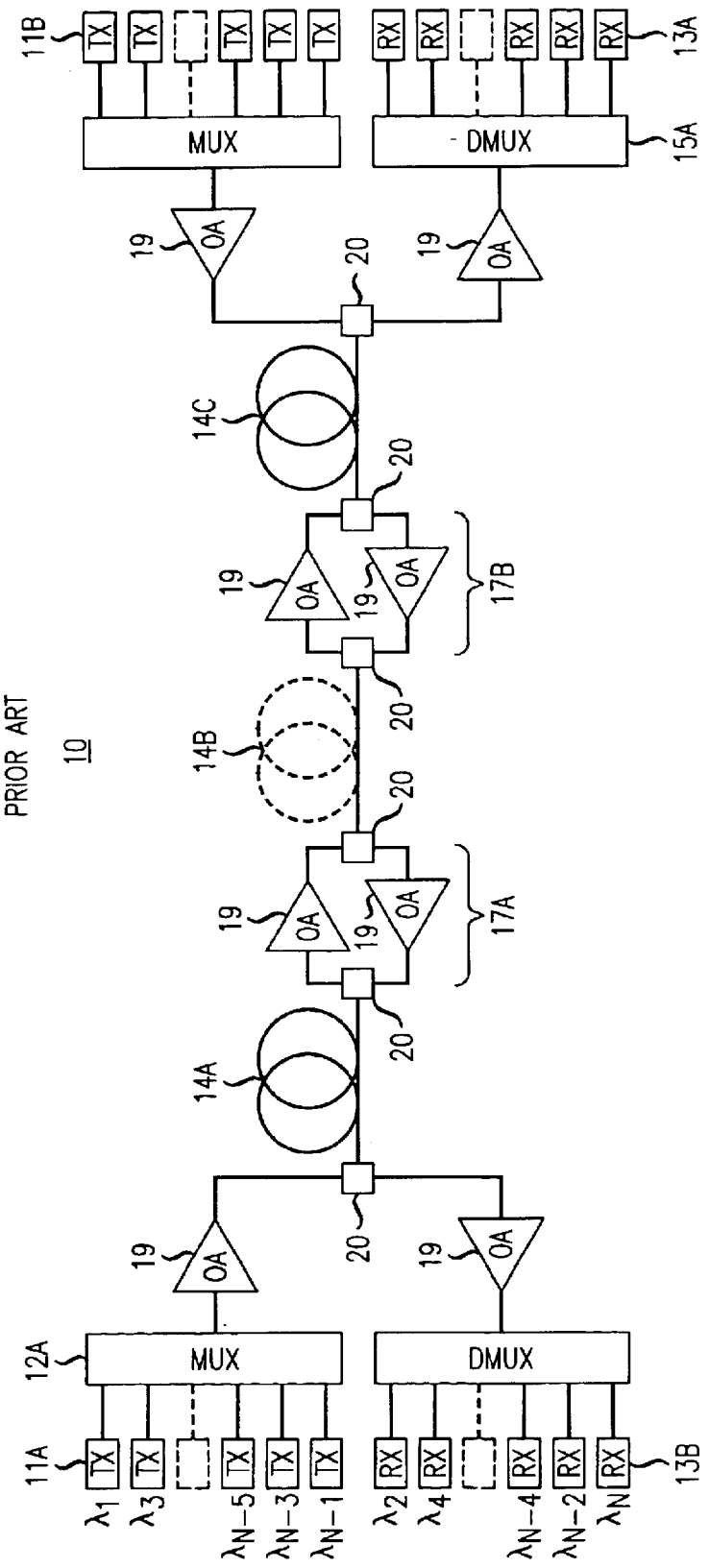
FIG. 2 shows in block diagram form a pair of WDM systems transmitting in opposite directions along a single fiber path in accordance with the prior art.

FIG. 2 shows in block schematic form the basic elements of a typical optical bidirectional interleaved optical transmission system 10 in which a number of transmitters 11A operating at odd-numbered channels supply a multiplexer 12 which combines the channel signals into a multichannel signal for transmission from left to right along the fiber waveguide 14 to the receivers 13A by way of demultiplexer 15A. At the other end of the waveguide there are a like number of transmitters operating at the even-numbered channels for supplying the waveguide with signals for transmission from right to left to receivers 13B. To simplify the disclosure, such signals will be described as two sets of signals of interleaved wavelengths. The fiber is shown separated into three spans 14A, 14B, 14C, although there is no real limit to the number of spans. Between the spans are located bidirectional gain blocks 17A and 17B. Each gain block includes a separate unidirectional optical amplifier (OA) for each direction. In addition to the bidirectional gain blocks 17A, 17B, separate unidirectional optical amplifiers 19 are positioned in the wave paths ahead of the multiplexers and demultiplexers. Optical routing elements, such as circulators 20, are included appropriately along the fiber to direct the travel of odd-numbered input channels from left to right and the even-numbered input channels for travel from right to left. When use is being made of only three ports of a router, a three-port router can be used, although in the exemplary embodiments four-port routers are being included. As mentioned earlier, it will be convenient to describe the transmission of the light traveling in the desired direction as codirectional and any light traveling in the direction opposite that assigned, such as light redirected by reflection at a waveguide adjacent in its wave path, as counterdirectional. The gain blocks themselves, for example, may act as discontinuities to provide such reflection. Reflections can occur at various other points along the wave path and give rise to counterdirectional light. In addition, Raleigh-back scatter from the intrinsic nature of the fibers will always exist.

A difficulty with the basic system shown in FIG. 2 is that light traveling codirectionally along the wave path will tend to experience reflections so as to travel counterdirectionally. Such light will commingle with codirectional light and interact with it in a manner to impair the quality of the codirectional light by generating random crosstalk. It is such problems that the invention seeks to ameliorate.

Figure 3:
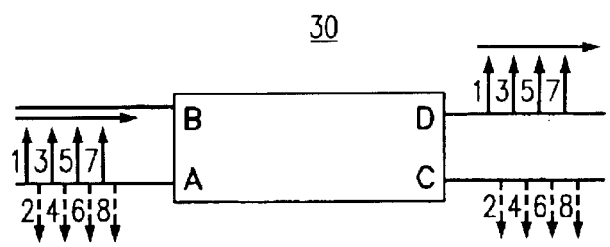
FIG. 3 shows a suitable interleaver in a four-port topological form for separating and/or combining optical channels into two different physical paths for use in the invention.

FIG. 3 shows in symbolic form a four-port interleaver 30 of the kind that is used in the invention to ameliorate the problem. Odd-channel light entering at port A exits selectively at port D, while even-channel light entering there exits selectively at port C. Ports A and D shall be described as the assigned ports for signals of the odd-numbered channels and ports A and C as the assigned ports for the even-numbered channels. The operation is reciprocal, odd-channel light entering at port D exits selectively at port A, even-channel light entering at port C exits selectively at port A. Similar functionality exists for port B. Odd channel signals entering at port B will exit at port C, while even channel signals entering at port B will exit at port D.

Figure 4:
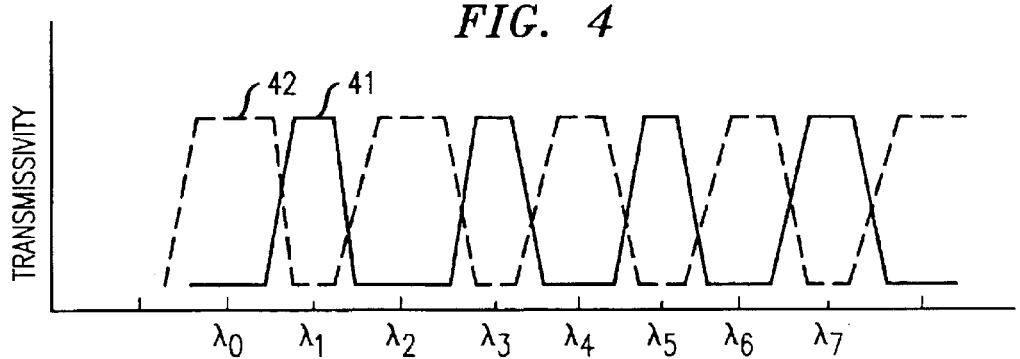
FIG. 4 shows the spectral response desired for the interleaver of FIG. 3 for east to west and west to east propagating of eight interleaved channels.

FIG. 4 shows the spectral response desired for an interleaver for use in the invention in which the wavelength of the light is plotted along the X-axis and its transmittance is plotted along the Y-axis. The solid line 41 represents the codirectional transmissivity for the set of odd wavelengths between either of its two assigned pairs, (A–D) or (B–C). As seen, it is high at the odd wavelengths and low at the even wavelengths. The broken line 42 similarly represents the transmissivity for the set of even channels between its assigned pairs (A–C) (B–D). As seen, it is high at the even wavelengths and low at the odd wavelengths. As can be appreciated from the drawing, the two sets of channels have interleaved transmissivity characteristics, the reason for the choice of name for the element.

Figure 5:
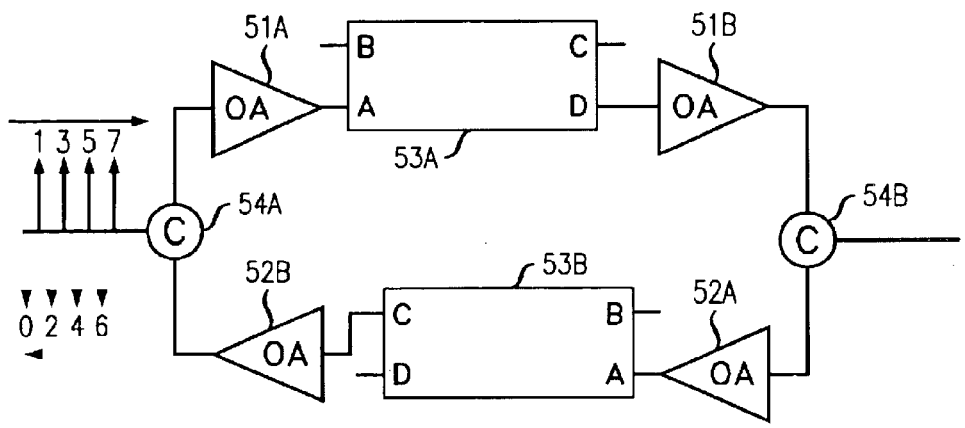

FIG. 5 shows a relatively simple pair gain block 50 for use with the invention for use when the interleavers included possess significant conversion loss even for the codirectional travel of light therethrough since the use permits recovery of the amplifier noise figure and signal power.

The gain block 50 comprises four optical amplifiers, two poled in each of the two directions. Amplifiers 51A and 51B are poled to amplify codirectional odd-channel light traveling from left to right. Amplifiers 52A and 52B are poled to amplify even-channel codirectional light traveling from right to left. Interleaver 53A is interposed between amplifiers 51A and 51B. Interleaver 53B is interposed between amplifiers 52A and 52B. Unused ports advantageously are terminated in a non-reflective manner. Amplifier 51A supplies port A of interleaver 53A and its port D supplies amplifier 51B. Amplifier 52A supplies port A of interleaver 53C and its port C supplies amplifier 52B. Circulators 54A and 54B are connected to the ends of the waveguide span between which the gain block is inserted. Circulator 54A supplies input light to amplifier 51A and circulator 54B supplies input light to amplifier 52A. Codirectional traveling light passes selectively through each interleaver and is amplified; most counterdirectional light fails to reach the input of the succeeding amplifier and so is suppressed.

Figure 6:
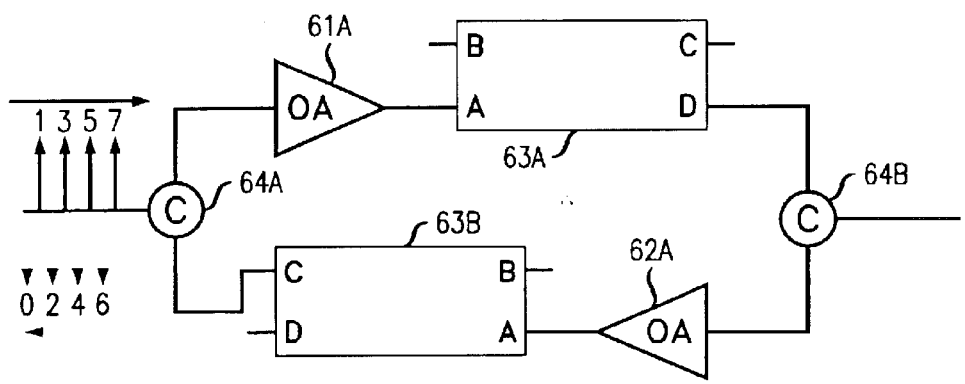

The gain block 60 shown in FIG. 6 is more suitable for use where the interleaver introduces insignificant loss to codirectional light. In this case, there may be eliminated the optical amplifier (51B, 52B) used in the FIG. 5 block to amplify the codirectional light passing successfully through the interleaver. Accordingly the path for the codirectional odd-channel light comprises the optical amplifier 61A and interleaver 63A and the path for the codirectional odd-channel light comprises the optical amplifier 62A and the interleaver 63B. Circulators 64A and 64B are included at appropriate ends of the gain block.

Figure 7:
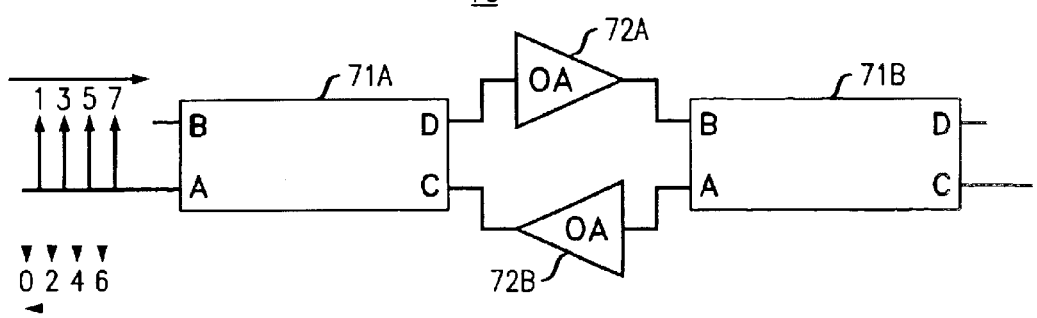

FIG. 7 shows a gain block 70 that is characterized by the fact that counterdirectional light is blocked before it reaches an optical amplifier of the gain block. In this gain block 70, the interleavers 71A and 71B are interposed at opposite ends of the gain block in the path of optical amplifiers 72A and 72B, respectively, to block the entry of counterdirectional light from entry into the amplifier.

Figure 8:
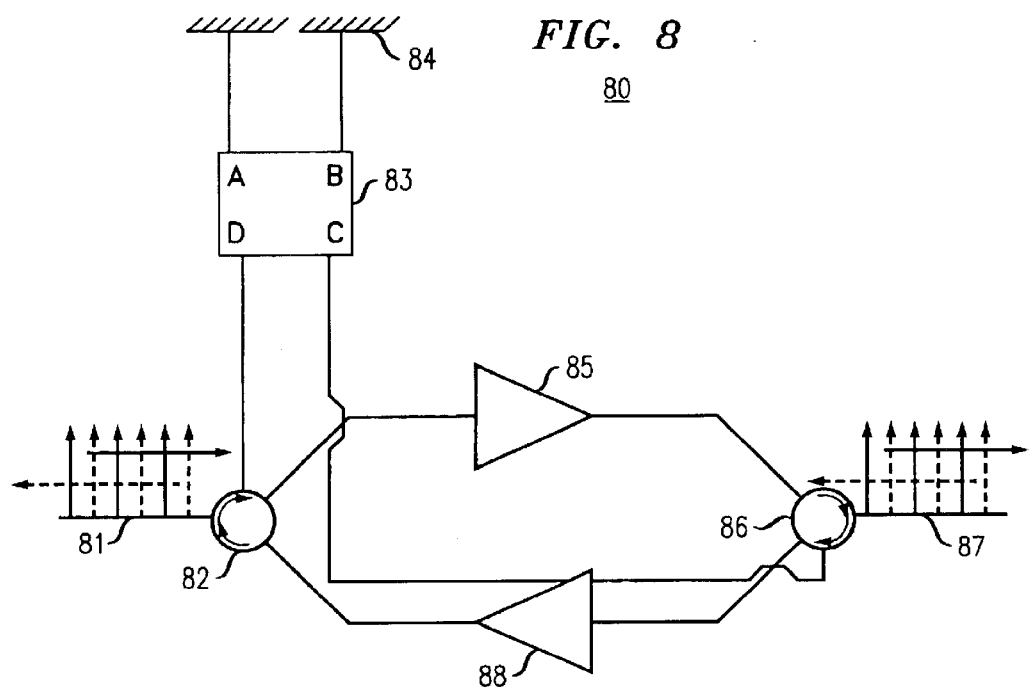

An important consideration in systems in which a number of optical c interleavers are cascaded because a number of spans are involved is in their spectral uniformity and isolation depth. FIG. 8 is an embodiment in which the gain block 80 employs a single interleaver, two circulators, a mirror and two optical amplifiers.

Input odd-channel light from the fiber 81 enters a first port of circulator 82, exits through the second port of the circulator to enter port D of the interleaver 83, and exits at port A to be reflected by the mirror 84 back into port A of interleaver 83 for exit at port D, entry into the circulator 82 for exit to enter the optical amplifier 85 for entry into a first port of circulator 86 and exit therefrom at the next port into the fiber 87.

The even-channel signals enter from the fiber 87 at the input port of circulator 86 to exit at the next port for travel to port C of interleaver 83 and exit at port A for reflection by mirror 84 back into port A and exit at port C of interleaver 83. This light then passes again through circulator 86 before entry into optical amplifier 88. It exits from amplifier 88 for entry into the circulator 82 and exits therefrom into the fiber 81 for travel westward.

Figure 9:
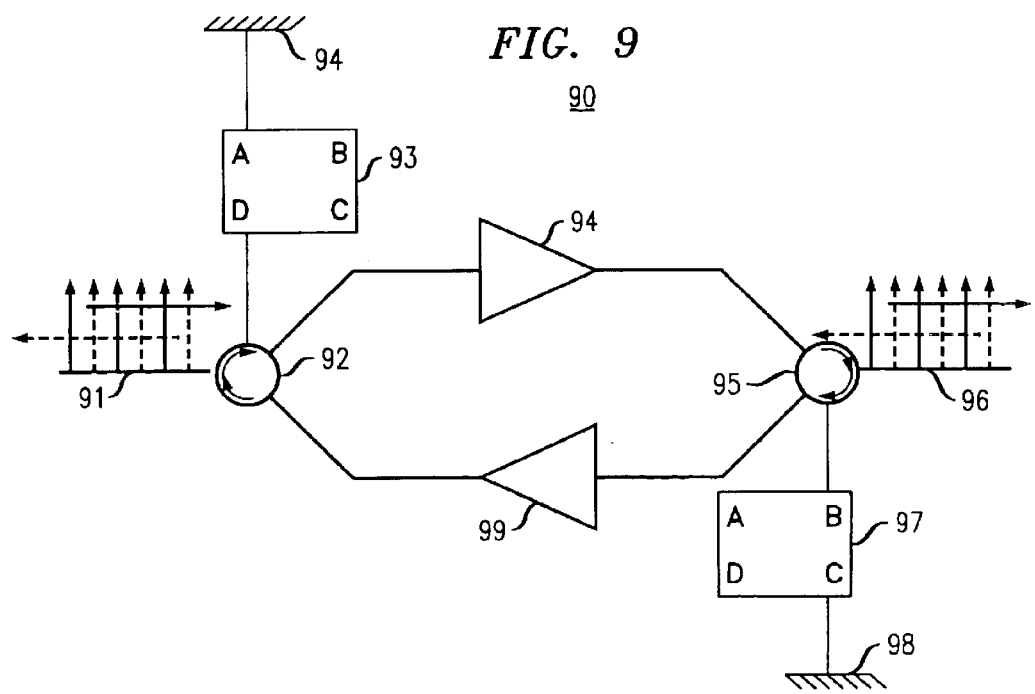

FIG. 9 shows, as another alternative, an arrangement 90 in which the interleaver is included after amplification of the signals. An input signal of odd channels supplied by input fiber 91 is applied to a port of circulator 92 for entry at port D and exit at port A of the interleaver 93. After reflection from the mirror 94 it re-enters interleaver 93 at port A and exits at port D back into the circulator 92 for transfer to the optical-amplifier 94 for amplification. After amplification it enters circulator 95 and exits into the output fiber 96.

Signals of even-numbered channels are supplied from input fiber 96 to circulator 95 for exit into port B of interleaver 97 and exit at port C for reflection at mirror 98. After reflection the signal re-enters interleaver 97 at port C and exits at port B for entry into circulator 95. It exits from the circulator 95 to enter into optical amplifier 99. After amplification the signal enters circulator 92 and exits into output fiber 91.

Figure 10:
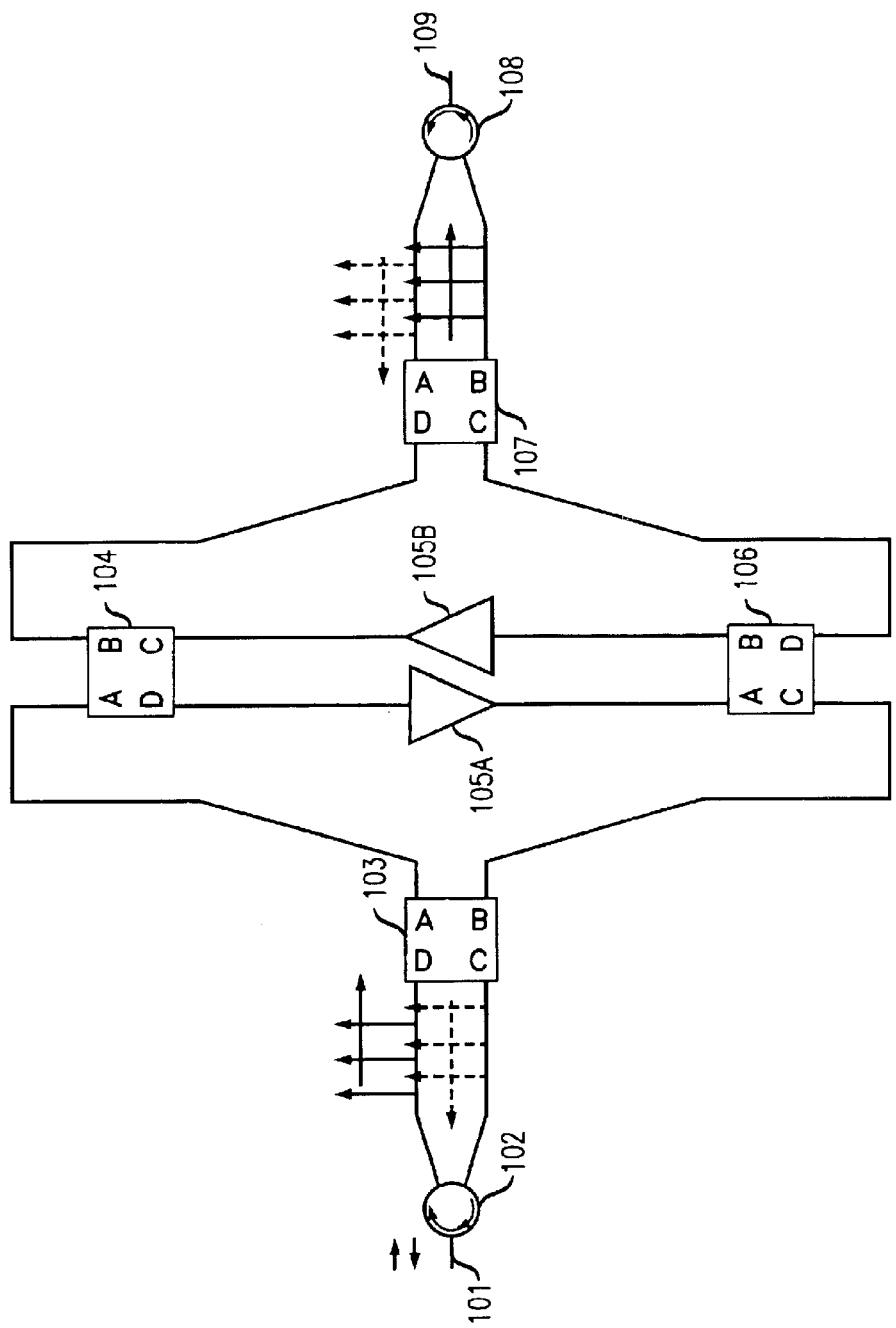

FIG. 10 illustrates a gain block 100 that provides four passages through separate interleavers for even stronger suppression of crosstalk caused by counterdirectional light.

Odd-numbered channels propagating to the right are supplied from fiber 101 by way of circulator 102 to the D port of interleaver 103 for exit at its port A. They then enter port A of interleaver 104 and exit at its port D and then pass through optical amplifier 105A After amplification they enter interleaver 106 by way of port A and exit at port D to pass on to the interleaver 107. They enter by port C and exit by port B and then pass through the circulator 108 to the output fiber 109.

The even-numbered channels enter from input fiber 109, pass through the circulator 108, enter interleaver 107 by way of port A and exit at port C. They then enter interleaver 106 by port D and exit by port B to pass through optical amplifier 105B. After amplification they pass into interleaver 104 entering at port C and exiting at port A after which they enter interleaver 103 by way of port A and exit therefrom by way of port C. From there they propagate through circulator 102 to output fiber 101.

Figure 11:
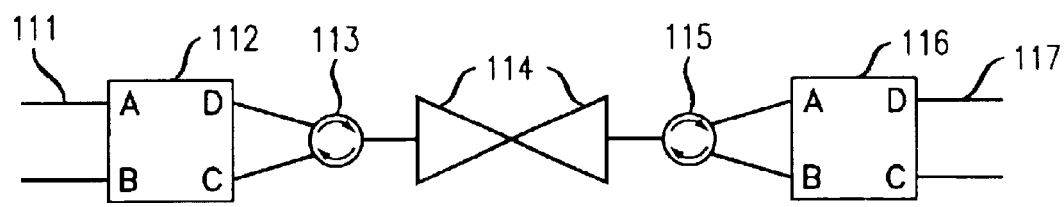
Figure 12:
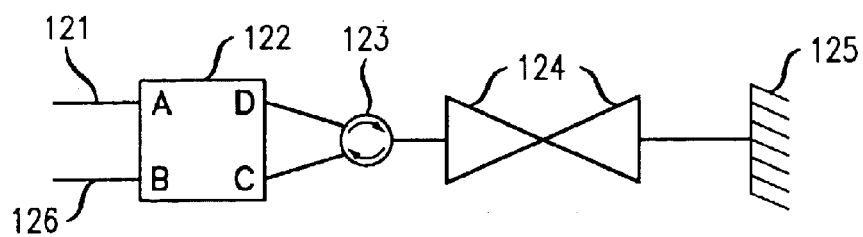

In the case where there are available bidirectional optical amplifiers that can be used for amplification in either direction of travel therethrough by the even- and odd-numbered channels, architecture of the kind shown in FIG. 11 and FIG. 12 becomes feasible.

In the gain block of FIG. 11, the odd-numbered channels traveling eastward are supplied from input fiber 111 to the port A of interleaver 112 for exit at port D for passage through circulator 113 for travel to the input of the bidirectional amplifier 114 for passage therethrough and into a port of the circulator 1 for exit therefrom and entrance into port A of interleaver 116 for exit at port D and passage into the output fiber 117 for further eastward travel. The even-numbered channels traveling westward are supplied to port D of the interleaver 116 for exit at port B and entrance into a port of circulator 115 for exit therefrom for amplification. Upon exiting from the amplifier 114, the even-numbered channels enter a port of circulator 113 and exit therefrom to enter port C of the interleaver 112 to exit at port A to continue westward along fiber 111.

In the architecture of the gain block 120 of FIG. 12, a mirror is used to replace one of the interleavers and one of the circulators. This may alleviate problems arising from the need of spectral alignment between separate interleavers. In gain block 120, odd-numbered channels are supplied from input fiber 121 to port A of the interleaver 122 to exit at port D for entrance into circulator 123 for passage therethrough to enter the bidirectional amplifier 124 for amplification. After exit therefrom, the signal light is reflected back by mirror 125 for re-entry into the bidirectional amplifier 124 for further amplification. After amplification, the signal light passes through the circulator 123 and enters port C of the interleaver 122 to exit at port B to pass on to the fiber 126 for further travel.

The even-numbered channels are supplied by fiber 126 to port B of the interleaver 122 for exit at port D and entry into circulator 123. From circulator 123, the light channels pass into the bidirectional amplifier 124 for amplification. After amplification, the exiting light is made incident on mirror 125 for reflection and re-entry into the bidirectional amplifier 124 for further amplification. After amplification, the exiting light passes through the circulator 123 for entry into port C of interleaver 122 and exit therefrom by way of port A into fiber 121 for further travel there along.

It is to be understood that the various embodiments described are intended to be exemplary of the basic principles involved and that various other embodiments may be devised by a worker in the art without departing from the basic principles of the invention.

We claim:

1. Apparatus for use in a bidirectional optical wavelength division multiplexed transmission system in which first direction odd-numbered channels are interleaved with opposite direction even-numbered channels comprising first and second terminals, and a gain block inserted between the two terminals for amplifying both odd-numbered channel signals propagating from said first to said second terminal and even-numbered channel signals propagating from said second terminal to said first terminal, characterized in that the gain block includes an interleaver means for selectively transmitting odd-numbered channel signals propagating codirectionally from said first to said second terminal and for selectively transmitting even-numbered channel signals propagating codirectionally from said second terminal to said first terminal, said interleaver means positioned to block counterdirectional crosstalk, codirectional crosstalk and roundtrip gain of said channels.

2. The apparatus of claim 1 in which the gain block includes a pair of paths between said first and second terminals and separate interleaver means are included in each path.

3. The apparatus of claim 2 in which the first path of the gain block includes an amplifier poled to amplify signals propagating in the direction from the first terminal to said second terminal and the second path of the gain block includes an optical maplifier poled to amplify signals propagating in the direction from the second terminal to the first terminal.

4. The apparatus of claim 3 in which a separate interleaver means is connected ahead of each optical amplifier.

5. The apparatus of claim 3 in which a separate interleaver means is also connected behind each optical amplifier.

6. A gain block for insertion in a span between two spaced terminals of a bidirectional optical transmission line for amplification selectively only of codirectional signals of two sets of interleaved wavelengths, the signals of the two sets having different directions of assigned travel between the two terminals comprising a pair of routing elements, a pair of optical amplifiers, two multiport interleaver means each having assigned pairs of port for selective-high transmissivity, characterized in that the foregoing elements are arranged so that input signals of the first set from the first terminal pass in turn through the first routing element, the first optical amplifier, its assigned ports of the first interleaver means, and the second routing element, and so that input signals of the second set from the second terminal pass in turn through the second routing element, the second optical amplifier, its assigned ports of the second interleaver means, and the first routing element, wherein the interleaver means is positioned to block counterdirectional crosstalk, codirectional crosstalk and roundtrip gain.

7. The gain block of claim 6 that further includes a third optical amplifier between the first interleaver means and the second routing element and a fourth optical amplifier between the second interleaver means and the first routing element.

8. A gain block for insertion between two spaced-apart terminals of a bidirectional optical transmission system for selective amplification only of codirectional signals of two sets of interleaved wavelengths, the two sets having opposite assigned directions of transmission comprising a pair of multiport interleaver means having assigned pairs of ports selectively of high transmissivity and a pair of optical amplifiers characterized in that the foregoing elements are arranged so that input signals of the first set from first terminal pass in turn through their assigned ports of the first interleaver means, the first optical amplifier and their assigned ports of the second interleaver means to the second terminal, and input signals of the second set from the second terminal pass in turn through their assigned ports of the second interleaver means, the second optical amplifier, and their assigned ports of the first interleaver means to the first terminal, wherein the interleaver means is positioned to block counterdirectional crosstalk, codirectional crosstalk and roundtrip gain.

9. A gain block for insertion in a span between two spaced-apart terminals of a bidirectional optical transmission line for amplification selectively only of codirectional signals of two sets of interleaved wavelengths, the two sets having different directions of assigned travel along the transmission line between the two terminals comprising a pair of multiport routing elements at opposite ends of the span of transmission line, a pair of optical amplifiers, a multiport interleaver means for providing gain selectively in codirectional signals traveling between an assigned pair of its ports, the pair being different fro the two sets of interleaved wavelengths, a reflector, said above-mentioned elements being connected optically such that the first set of signals supplied at the first of the two terminals arrives at the second of the two terminals by way in turn of the first routing element, the interleaver means, the first reflector, the interleaver means, the first optical amplifier and the second routing element, and the second set of signals supplied at the second of the two terminals arrives at the first of the two terminals by way of the second routing element, the interleaver means, the reflector, the interleaver means, the second routing element, the second optical amplifier, and the first routing element, the interleaver means is positioned to block counterdirectional crosstalk, codirectional crosstalk and roundtrip gain.

10. A gain block for insertion in a span between two spaced terminals of a bidirectional transmission line for amplification selectively only of codirectional signals of two sets of interleaved wavelengths, the two sets having different directions of assigned travel along the transmission between the two terminals comprising a pair of multiport routing elements at opposite ends of the span of transmission line, a pair of optical amplifiers, a pair of multiport interleaver means, each for providing gain selectively to codirectional signals traveling between a pair of assigned ports, the pair being different for the two sets of interleaved wavelengths, and a pair of mirrors, said above-mentioned elements being connected optically such that the first set of wavelengths supplied as inputs to the first terminals arrives as the output at the second terminal by way of the first routing element, a first passage through the first interleaver means, reflection at the mirror, a second passage through the first interleaver means, a second passage through the first routing element, passage through the first optical amplifier for amplification, passage through the second routing element to the second terminal, and the second set of interleaved wavelengths travels to the first terminal by way of the second routing element, a first passage through the second interleaver means, reflection at the second mirror, a second passage through the second interleaver means, a second passage through the second routing element, amplification in the second optical amplifier, and passage through the first routing element to the first terminal, wherein the interleaver means is positioned to block counterdirectional crosstalk, codirectional crosstalk and roundtrip gain.

11. A gain block for insertion in a span between two spaced-apart terminals of a bidirectional optical tranmission line for amplification selectively only of codirectional signals of two sets of interleaved wavelengths, the two sets having opposite directions of assigned travel along the transmission line between the two terminals, comprising a pair of circulators, a pair of optical amplifiers, four multiport interleavers used for providing gain selectively between an assigned pair of ports, the pairs being different for the two sets of interleaved wavelengths, characterized in that the above-mentioned elements are arranged such that the first set of signals when supplied to the terminal arrives at the second terminal by way in turn of the first calculator, its assigned ports of the first interleaver, its assigned ports of the second interleaver, the first optical amplifier, its assigned ports of the third interleaver, its assigned ports of the fourth interleaver, and the second circulator to the second terminal, and the second sets of signals when supplied to the second terminal passed in turn through the second circulator, its assigned ports of the fourth interleaver, its assigned ports of the third interleaver, the second optical amplifier, its assigned ports of the second interleaver, its assigned ports of the first interleaver and the first circulator to the first terminal, wherein the interleavers are adapted to block counterdirectional crosstalk, codirectional crosstalk and roundtrip gain.

12. A gain block for insertion in a span between two spaced-apart terminals of a bidirectional optical transmission line for amplification selectively only of codirectional signals of two sets of interleaved wavelengths, the signals of the two sets having opposite assigned directions of transmission between the two terminal comprising a pair of multiport interleavers each having assigned pairs of ports selectively of high transmissivity, a pair of circulators, and a pair of amplifiers in which the foregoing are arranged such that signals of the first set applied to the terminal pass in turn through assigned ports of the first interleaver, the first circulator, the bidirectional amplifier, the second circulator, assigned ports of the second interleaver to the second terminal, and the second set of signals supplied from the second terminal passes in turn through assigned ports of the second interleaver, the second circulator, the bidirectional amplifier, the first circulator and assigned ports of the first interleaver to the first terminal, wherein the interleavers are adapted to block counterdirectional crosstalk, codirectional crosstalk and roundtrip gain.

13. A gain block for use in a bidirectional optical transmission line for insertion between two terminals in the line comprising a multiport interleaver having first and second terminals between which the gain block is to be inserted comprising a multiport interleaver having pairs of assigned ports between which the transmissivity is selectively high, a circulator, a bidirectional optical amplifier and a mirror, characterized in that said foregoing elements are arranged such that a first set of two sets of interleaved wavelengths is applied from the first of the two terminals to a first port of an assigned pair of ports for travel in turn through the interleaver and exiting at the second of the assigned pair of ports for travel in turn through the circulator and bidirectional optical amplifier to the mirror, and after reflection returns through the circulator to one of a pair of assigned ports of the interleaver for exit at the other port of the assigned pair to the second terminal, and the second set of the two sets when applied to the second terminal travels to the first terminal by way of assigned ports of the interleaver, the circulator, the bidirectional amplifier and the mirror, and returns, after reflection, by the mirror, through the bidirectional amplifier, the circulator and the interleaver to the first terminal.

* * * * *